Figure 1:
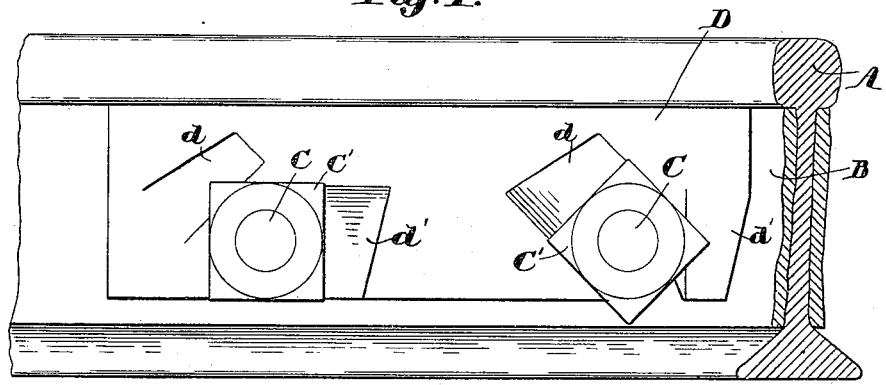

No. 611,838. Patented Oct. 4, 1898.
B. J. GILLIES.
NUT LOCK.
(Application filed May 2, 1898.)

(No Model.)

Witnesses:
Walter E. Lombard.
Fred S. Greenleaf.

Inventor:
Beverly J. Gillies.
by Crosby Gregory
Attys.

THE NORRIS PETERS CO., PHOTO-LITHO., WASHINGTON, D. C.

UNITED STATES PATENT OFFICE.

BEVERLY J. GILLIES, OF SOUTH FRAMINGHAM, MASSACHUSETTS.

NUT-LOCK.

SPECIFICATION forming part of Letters Patent No. 611,838, dated October 4, 1898.

Application filed May 2, 1898. Serial No. 679,418. (No model.)

*To all whom it may concern:*

Be it known that I, BEVERLY J. GILLIES, of South Framingham, county of Middlesex, State of Massachusetts, have invented an Improvement in Nut-Locks, of which the following description, in connection with the accompanying drawings, is a specification, like letters on the drawings representing like parts.

My invention is an improvement in nut-locks whereby a nut is locked automatically and positively in any desired position. Various devices of this character have been heretofore provided and suggested, but most of these have required considerable manipulation in order to render them operative, and they have been adapted only for certain situations.

My invention provides a nut-lock in which spring-tongues or sloping portions project from a plate. I am aware that nut-locks have heretofore been devised which have employed spring-tongues similar in general shape to those which are used in my invention, but not arranged and operated as the tongues in my construction; but, on the contrary, those heretofore proposed have required the operator to depress them in order to turn the nut forward, and they have been capable only of holding the nut in one position and not in practically any position, as in my case, and, furthermore, the old nut-locks here referred to have been incapable of holding a nut against turning unless the nut-lock plate had a shoulder to bear against, whereas mine is self-retaining independently of any adjacent shoulder or special configuration.

In the drawings herewith I have shown a preferred form of my invention, and have illustrated its manner of use.

Figure 2:
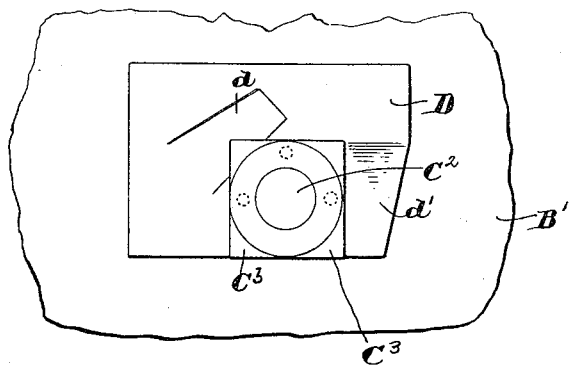
Figure 3:
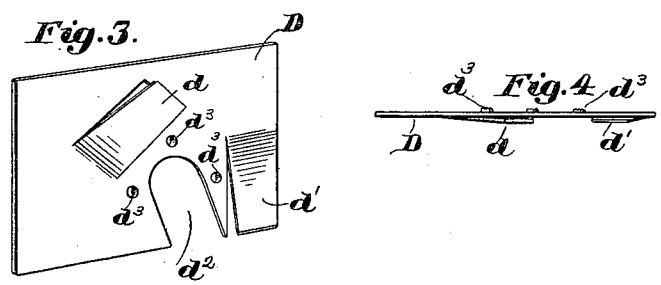
Figure 4:
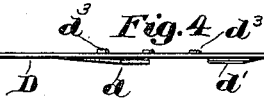

Figure 1 illustrates my improved nut-lock applied to the fish-plate of a track-rail. Fig. 2 is a similar view in elevation of my invention, retaining a nut on an ordinary plane surface or wall. Fig. 3 shows my invention in perspective, and Fig. 4 is a top edge view thereof.

In Fig. 1, A designates a usual T railroad-rail to which a fish-plate B is secured by bolts C and nuts C', which are locked in place by my improved nut-lock. (Shown at D.)

The nut-lock is made of a suitable plate, preferably of spring-steel, from which tongues $d$ $d'$ are cut and bent forward slightly, as clearly shown in Fig. 3. These tongues are arranged at an angle to each other, as indicated, and project forward in the direction of forward rotation of the nut, and are so located that the nut engages the tongues at or near their base, thereby freely depressing each tongue as the nut is turned home, so that the nut itself automatically holds or pushes the tongues ahead of it as it is turned to the right in tightening. As the nut, however, is turned from the position shown at the left, Fig. 1, to that shown at the right, the tongue $d$ springs up and effectually prevents the nut from being turned back, the forward shoulder or corner of the nut, however, meantime engaging the tongue $d'$ and depressing it, so that as the nut is given a quick turn further, or from the position at the right to that at the left, the tongue $d'$ springs up and locks the nut against backward movement. This operation continues as long as the nut is turned forward, the nut being effectually locked from any backward turn the moment that its corner has passed either tongue.

The plate is cut away, as indicated at $d^2$, on an angle in order that it may not be as readily removed by any upward or longitudinal blow.

Referring now to Fig. 2, B' designates a plane wall or other surface against which my nut-lock is placed over a bolt $C^2$ for locking a nut $C^3$ in desired position.

In order that the nut-lock may not turn on the surface B', I punch one or more spurs or prongs $d^3$. (Shown clearly in Figs. 3 and 4 and indicated by dotted lines in Fig. 2.) These spurs effectually grip into the surface against which the nut-lock is placed and hold it positively against movement, and, it being remembered that the plate B is made of steel, this feature of my invention enables it to hold with certainty on any usual surface against which it may be placed. For example, if a single nut-lock, as shown in Fig. 3, were placed over a bolt on a fish-plate instead of the double nut-lock, as shown in Fig. 1, the spurs $d^3$, being of steel, are forced by the turning home of the nut directly into the softer iron of the fish-plate, embedding themselves sufficiently to hold the nut from backward rotation. This feature of my invention is of great practical importance, especially in railroad-work, where it has been desirable to use nut-locks in such places as on car-trucks; but there has been no simple means adapted at once to all situations for retaining the nut-lock. My invention, however, meets the want in a most satisfactory degree.

Various minor changes in form and arrangement may be resorted to within the spirit and scope of my invention.

Having described my invention, what I claim, and desire to secure by Letters Patent, is—

1. A nut-lock made of one rectangular piece of sheet metal provided with a recess extending approximately to the middle of the piece obliquely from one of the edges thereof, to fit over a bolt whose nut is to be locked, and provided with a plurality of spring-tongues struck up from the metal, said tongues being remote from said recess and disposed at oblique angles to each other and sloping outwardly in the direction of forward or tightening rotation of the nut, substantially as described.

2. A nut-lock made of one piece of sheet metal provided with a recess extending approximately to the middle of the piece obliquely from one of the edges thereof, and provided with a plurality of spring-tongues struck up from the metal, said tongues being remote from said recess and extending obliquely one to the other about said recess, and one or more spurs $d^3$ punched in the body of the metal between said recess and said tongues in a position beneath the nut locked by said tongues, said spurs projecting inwardly slightly to be pressed by the nut into the material back of the nut-lock, substantially as described.

In testimony whereof I have signed my name to this specification in the presence of two subscribing witnesses.

BEVERLY J. GILLIES.

Witnesses:
GEO. W. GREGORY,
GEO. H. MAXWELL.